United States Patent
du Toit et al.

(10) Patent No.: US 12,407,653 B2
(45) Date of Patent: Sep. 2, 2025

(54) NETWORK SECURITY DEVICE

(71) Applicant: CA, Inc., San Jose, CA (US)

(72) Inventors: Roelof Nico du Toit, Portersville, PA (US); Gary Tomic, Petersburg (CA); Chris Zuercher, Newmarket (CA); Nour Alhouda Elkadri, Kitchener (CA)

(73) Assignee: CA, INC., San Jose, CA (US)

( * ) Notice: Subject to any disclaimer, the term of this patent is extended or adjusted under 35 U.S.C. 154(b) by 235 days.

(21) Appl. No.: 18/362,881

(22) Filed: Jul. 31, 2023

(65) Prior Publication Data

US 2025/0047642 A1 Feb. 6, 2025

(51) Int. Cl.
*H04L 9/40* (2022.01)
(52) U.S. Cl.
CPC ...... *H04L 63/0263* (2013.01); *H04L 63/0236* (2013.01)
(58) Field of Classification Search
CPC .......... H04L 63/0263; H04L 63/0236
See application file for complete search history.

(56) References Cited

U.S. PATENT DOCUMENTS 10,708,233 B2 * 7/2020 Goyal ............... H04L 63/0281
11,909,762 B2 * 2/2024 Vesnovaty ............ H04L 7/0008
2013/0019277 A1 * 1/2013 Chang ............... H04L 63/0227 726/1
2017/0331859 A1 * 11/2017 Bansal ............... H04L 63/029
2021/0135993 A1 * 5/2021 Mittal ............... H04L 45/24
2023/0048431 A1 * 2/2023 Vesnovaty ............ H04L 7/0008

* cited by examiner

Primary Examiner — Cheng-Feng Huang

(57) ABSTRACT

Operations of a security device are provided herein. The operations may include receiving, via a first network interface, a network packet, and evaluating attributes of the received network packet against a ruleset to identify a first rule match, wherein the attributes comprise an identifier of the first network interface, a source address, and a destination address. The operations may further include comparing the attributes of the received network packet against a table listing one or more network devices associated with the first network interface or a second network interface. The operations may further include switching the attributes of the received network packet by changing the identifier of the first network interface to an identifier of the second network interface and swapping the source address and the destination address, and evaluating the switched attributes of the received network packet against the ruleset to identify a second rule match. The switched attributes of the received network packet may be compared against the table, and one of the first rule match or the second rule match may be selected based on the comparisons of the network packet attributes and the switched network packet attributes against the table. The received network packet may be processed according to the selected one of the first rule match or the second rule match.

20 Claims, 6 Drawing Sheets

TABLE 300

| RULE PRIORITY | RULE ATTRIBUTES | FLOW VERDICT |
|---|---|---|
| 1 | INTERFACE = A, SOURCE ADDRESS = DEVICE 120, DESTINATION ADDRESS = ANY | FORWARD |
| 2 | INTERFACE = B, SOURCE ADDRESS = DEVICE 140, DESTINATION ADDRESS = ANY | INSPECT |
| 3 | INTERFACE = A, SOURCE ADDRESS = ANY, DESTINATION ADDRESS = ANY | INSPECT |
| 4 | INTERFACE = ANY, SOURCE ADDRESS = ANY, DESTINATION ADDRESS = ANY | DROP |

FIGURE 3A

TABLE 310

| NETWORK INTERFACE | KNOWN NETWORK ADDRESS |
|---|---|
| INTERFACE A | ADDRESS = DEVICE 120 |
| INTERFACE B | ADDRESS = DEVICE 140 |

FIGURE 3B

TABLE 400

|  | START DIRECTION KNOWN ORIGINAL INTERFACE KNOWN | START DIRECTION KNOWN ORIGINAL INTERFACE NOT KNOWN | START DIRECTION NOT KNOWN ORIGINAL INTERFACE NOT KNOWN |
|---|---|---|---|
| NO TOPOLOGY KNOWLEDGE | NORMAL RULESET EVALUATION | REVERSE RULESET EVALUATION WITH TIE-BREAKER | NORMAL AND REVERSE RULESET EVALUATION WITH TIE-BREAKER |
| PARTIAL TOPOLOGY KNOWLEDGE | NORMAL RULESET EVALUATION | REVERSE RULESET EVALUATION WITH TIE-BREAKER OR PRIORITY | NORMAL AND REVERSE RULESET EVALUATION WITH TIE-BREAKER OR PRIORITY |
| COMPLETE TOPOLOGY KNOWLEDGE | NORMAL RULESET EVALUATION | REVERSE RULESET EVALUATION WITH PRIORITY | NORMAL AND REVERSE RULESET EVALUATION WITH PRIORITY |

FIGURE 4

NETWORK SECURITY DEVICE

TECHNICAL FIELD

The present description relates in general to network communications including, for example, applying network traffic policies to network communications.

BACKGROUND

Network administrators may apply network traffic policies to network communications with devices on the network(s) under their supervision. The network traffic policies may specify how different types of network communications are managed. For example, network communications from known malicious servers or unrecognized network traffic may be inspected and/or dropped prior to reaching a destination device based on a network traffic policy. Enforcement of network traffic policies may be performed by network security devices such as firewalls, secure web gateways, proxy servers, etc.

BRIEF DESCRIPTION OF THE DRAWINGS

Certain features of the subject technology are set forth in the appended claims. However, for purposes of explanation, several aspects of the subject technology are set forth in the following figures.

FIG. 3A depicts a table containing a ruleset according to aspects of the subject technology.

FIG. 3B depicts a network topology table according to aspects of the subject technology.

FIG. 4 depicts a table illustrating operating modes of a network security device according to aspects of the subject technology.

DETAILED DESCRIPTION

Figure 1:
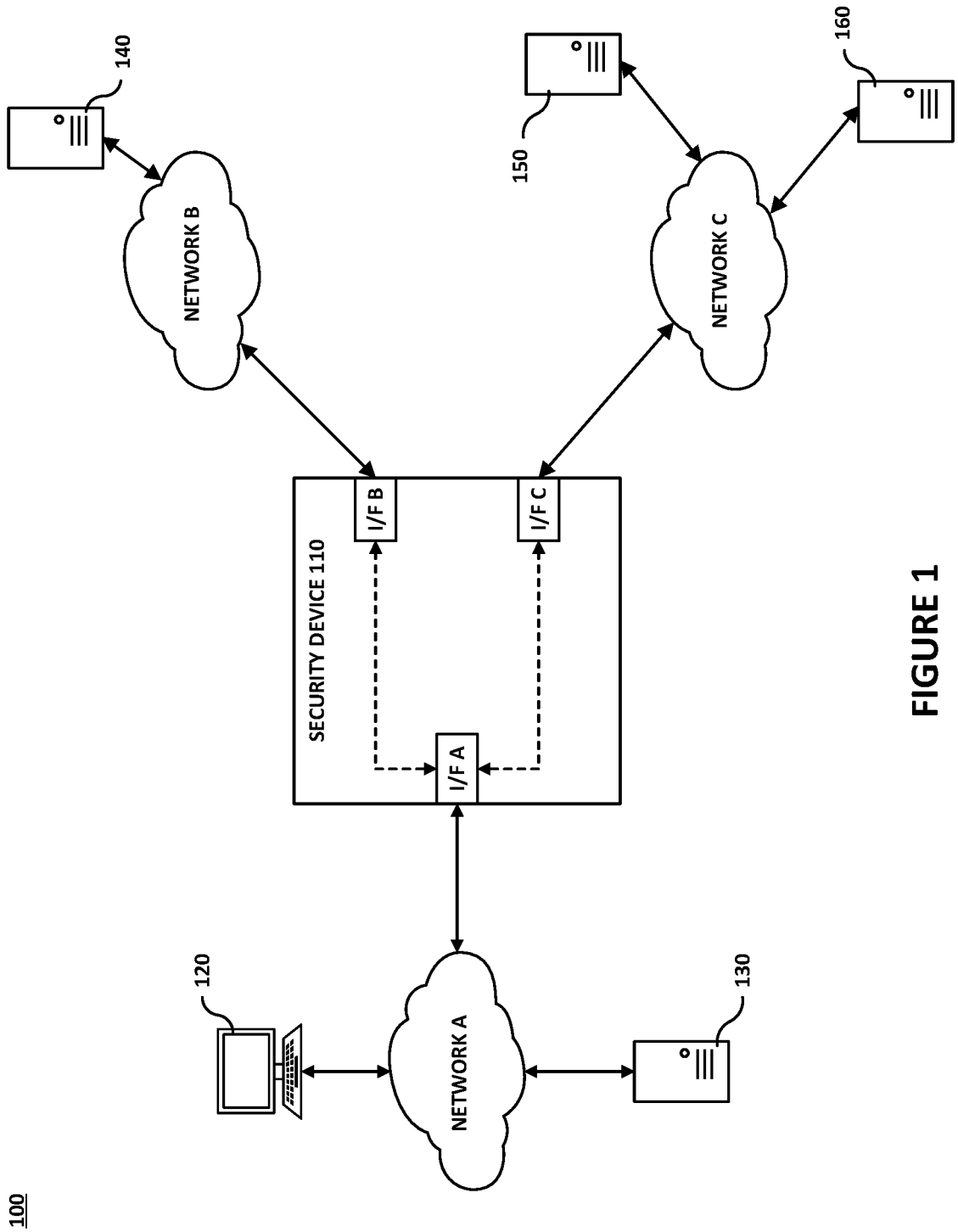
FIG. 1 illustrates an example of a network environment in which aspects of the subject technology may be implemented.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Network security devices may be configured to monitor network communications according to one or more network traffic policies to hamper the ability of malicious or otherwise harmful network communications from reaching devices on a protected network. For example, a firewall may be configured so that all network communications with devices on a protected network traverse the firewall so that a network traffic policy may be enforced on the network communications. Network communications may include a series of network packets forming a network flow. The network packets of a network flow may share a common n-tuple, such as a 5-tuple comprising source address, source port, destination address, destination port, and protocol. For connection-oriented network protocols such as Transmission Control Protocol (TCP), a connection is established between two network devices for transmitting a series of network packets. After the series of network packets has been transmitted between the two network devices, the connection between the network devices may be terminated. Accordingly, the transmission of the series of network packets in a network flow may be bounded by the opening and closing of a session between two network devices. For connectionless network protocols such as User Datagram Protocol (UDP), a series of network packets may be transmitted between network devices without the establishment/termination of a connection between the network devices bounded by an initial network packet in the network flow and a last network packet communicated between two network devices prior to a lapse of a specified time period.

Firewalls, such as stateful firewalls, may monitor and log connection information for network flows permitted under an enforced network traffic policy. The initial network packet of a network flow may be used by a firewall for protocol analysis to identify an original direction of the network flow, an original network interface of the firewall on which the initial network packet was received, and/or a current network protocol state of the protocol being used for communicating the network flow. However, situations may arise where the first network packet (nth packet, where n>=2) of a network flow received by a firewall is not the initial network packet (nth packet, where n=1) of the network flow. For example, the firewall may be launched after one or more devices on a protected network have already established connection sessions with other devices. For cloud-based firewalls, network traffic may be shifted between different firewalls during established connection sessions for purposes such as load-balancing. When mid-flow situations such as these occur, the effectiveness and efficiency of the firewall's operations may be reduced.

The subject technology provides mechanisms to improve the effectiveness and efficiency of network security devices such as firewalls in mid-flow situations. As discussed in detail below, the subject technology may utilize network topology information when evaluating and processing a network flow in a mid-flow situation. In addition, the subject technology may utilize variations of attributes of network packets in a network flow to effectively and efficiently evaluate the network flow against a network traffic policy. These and other advantages will be readily apparent based on the description below.

FIG. 1 illustrates an example of a network environment 100 in which aspects of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

The example network environment 100 includes network security device 110, network devices 120, 130, 140, 150, and 160, and networks A, B, and C. As depicted in FIG. 1, network devices 120 and 130 are connected to network A, network device 140 is connected to network B, and network devices 150 and 160 are connected to network C. Network devices 120, 130, 140, 150, and 160 represent electronic devices configured to send and/or receive network packets using one or more network protocols. In FIG. 1, network device 120 is depicted as a personal computer and network devices 130, 140, 150, and 160 are depicted as servers. The subject technology is not limited to this combination of network devices and may be implemented with different numbers of personal computers and/or servers. Instead of a personal computer, one or more of the network devices may include all or part of a set-top box, a smartphone, a tablet device, a wearable electronic device such as a pair of glasses or a watch with one or more processors coupled thereto and/or embedded therein, a television or other display with one or more processors coupled thereto and/or embedded therein, or a video game console, for example. In addition, depicted servers may a represent single computing device or may represent multiple computing devices that are working together to perform the actions of a server computer (such as a cloud and/or a distributed system).

Networks A, B, and C may be public communication networks (such as the Internet, a cellular data network or dial-up modems over a telephone network) or private communications networks (such as private local area network (LAN) or leased lines). Networks A, B, and C may also include, but are not limited to, any one or more of the following network topologies, including a bus network, a star network, a ring network, a mesh network, a star-bus network, a tree or hierarchical network, and the like. In one or more implementations, network 208 may include transmission lines, such as coaxial transmission lines, fiber optic transmission lines, or generally any transmission lines, that communicatively couple network security device 110 and network devices 120, 130, 140, 150, and 160. Network devices 120, 130, 140, 150, and 160 may be communicatively coupled to networks A, B, and C using wired and/or wireless communication media and protocols. Networks A, B, and C may all be the same type of network having a common configuration or may be implemented in different combinations of network type and/or configuration.

As further depicted in FIG. 1, network security device 110 includes network interfaces A, B, and C configured to send and/or receive network packets via networks A, B, and C, respectively. The dashed lines depicted in network security device 110 represent network interface pairs. As illustrated, network interface A is associated with network interface B forming a first network interface pair. In addition, network interface A is associated with network interface C forming a second network interface pair. According to aspects of the subject technology, the interface pairs represent possible paths that network packets can take when traversing network security device 110. In the depicted example, network security device 110 is configured to route network packets between network interfaces A and B, and between network interfaces A and C. However, in this example, network security device is not configured to route network packets between network interfaces B and C. The subject technology is not limited to this number of network interfaces, nor this arrangement of interface pairs. Operations of a network security device according to aspects of the subject technology are described in further detail below.

Figure 2:
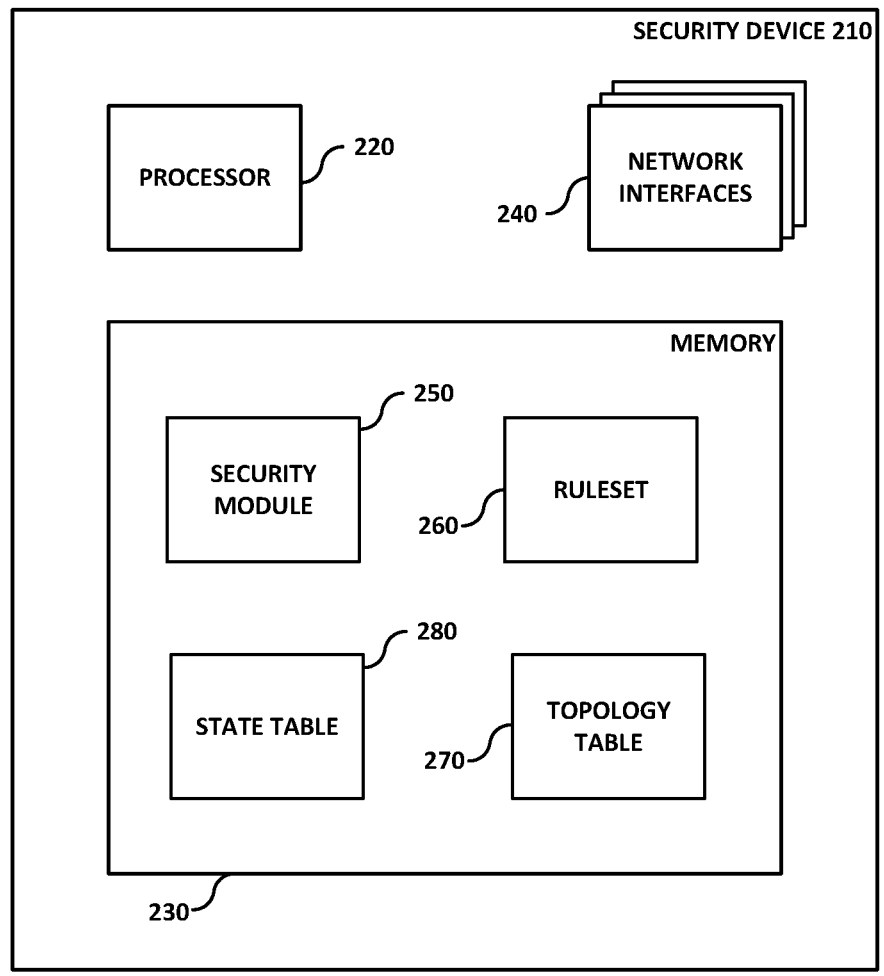
FIG. 2 is a block diagram illustrating components of a network security device according to aspects of the subject technology.

FIG. 2 is a block diagram illustrating components of a network security device, such as network security device 110 represented in FIG. 1, according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

In the example depicted in FIG. 2, network security device 210 includes processor 220, memory 230, and network interfaces 240. Processor 220 may include suitable logic, circuitry, and/or code that enable processing data and/or controlling operations of network security device 210. In this regard, processor 220 may be enabled to provide control signals to various other components of network security device 210. Processor 220 may also control transfers of data between various portions of network security device 210. Additionally, processor 220 may enable implementation of an operating system or otherwise execute code to manage operations of network security device 210.

Processor 220 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 230 may include suitable logic, circuitry, and/or code that enable storage of various types of information such as received data, generated data, code, and/or configuration information. Memory 230 may include, for example, random access memory (RAM), read-only memory (ROM), flash memory, magnetic storage, optical storage, etc. As depicted in FIG. 2, memory 230 contains security module 250, ruleset 260, topology table 270, and state table 280. The subject technology is not limited to these components both in number and type, and may be implemented using more components or fewer components than are depicted in FIG. 2.

According to aspects of the subject technology, security module 250 comprises a computer program having one or more sequences of instructions or code together with associated data and settings. Upon executing the instructions or code, one or more processes are initiated to evaluate received network packets against a ruleset corresponding to one or more network traffic policies and to select rule matches for processing the network packets based on comparisons of the network packets against device entries in a topology table. Example operations of security module 250 are described below.

According to aspects of the subject technology, ruleset 260 represents one or more data structures configured to contain one or more rulesets used by security module 250 to enforce corresponding network traffic policies. FIG. 3A depicts a table containing a ruleset according to aspects of the subject technology. As depicted in FIG. 3A, each rule in the ruleset may include a rule priority, rule attributes, and a flow verdict. The rules of a ruleset may be ordered and assigned respective rule priorities that are used when evaluating a network packet against the rule set. For example, a network packet may first be evaluated against the rule assigned rule priority 1, followed by the rule assigned rule priority 2, the rule assigned rule priority 3, and the rule assigned rule priority 4. The evaluation of a network packet proceeds through the ordered rule set until a rule match is found.

The rules of the ruleset set may be ordered based on a specificity of the respective rules. The specificity of a rule may be represented by the rule attributes associated with the rule. The rule attributes represent parameters of the rule against which attributes of a network packet are evaluated against to determine if there is a rule match. The attributes of a network packet may be determined from contents of the network packet, such as from header data and or payload, as well as information determined by the network security device upon receipt of the network packet, such as the network interface on which the network packet was received. For example, the rule attributes associated with the rule having rule priority 1 include, but are not limited to, the network interface on which the network packet was received being network interface A, the address of the source of the network packet being the address of network device 120, and the address of the indicated destination of the network packet being any address. Similarly, the rule attributes associated with the rule having rule priority 2 include, but are not limited to, the network interface on which the network packet was received being network interface B, the address of the source of the network packet being the address of network device 140, and the address of the indicated destination of the network packet being any address.

The rule attributes associated with the rules having priorities 3 and 4 are broader than those for the rules having priorities 1 and 2 in the table depicted in FIG. 3A. For example, the rule attributes for the rule having priority 3 include any network packet received on network interface A. In this example, this rule would encompass network packets received at network interface A from network devices other than network device 120, such as network device 130. Finally, in the depicted example the rule attributes for the rule having priority 4 are not limited to any particular network interface, source address, or destination address. This rule encompasses all network packets having attributes that fail to match with any of the preceding three rules. The subject technology is not limited to any particular ordering arrangement for the rules of a ruleset or rule attributes for any rule and may be implemented using other ordering methodologies and attributes in addition to those described above.

According to aspects of the subject technology, the flow verdict associated with each rule in the ruleset indicates how a network packet that has attributes that match those of the rule is to be processed by network security device 210. As depicted in FIG. 3A, the flow verdict for the rule assigned rule priority 1 is to forward the network packet to the destination address indicated in the network packet; the flow verdicts for the rules assigned rule priority 2 and rule priority 3 are to inspect the network packet to determine whether to forward the network packet to the indicated destination address or to drop the network packet to block the network packet from reaching the protected network; and the flow verdict for the rule assigned rule priority 4 is to drop the network packet to block the network packet from reaching the protected network. The subject technology is not limited to these flow verdicts and may be implemented using other flow verdicts and/or different flow verdict assignments.

Returning to FIG. 2, network topology table 270 represents one or more data structures configured to contain entries for network devices known to network security device 210. FIG. 3B depicts a network topology table according to aspects of the subject technology. As depicted in FIG. 3B, each entry in the network topology table includes a network interface associated with a network device and an address of the network device (or a range of addresses of network devices). In the example of FIG. 3B, network topology table 310 includes two known network devices: network device 120 associated with network interface A and network device 140 associated with network interface B. The associated network interface represents the network interface on which network security device 210 receives network packets from a network device associated with that network interface. Network topology table 310 may be maintained by a network administrator to add and/or remove entries from the table. Network topology table 310 also may be maintained dynamically by network security device 210 as network devices and their associated network interfaces are discovered and one or more criteria are met. The entries of network topology table 270 are not limited to those discussed above and may include other parameters or attributes.

Returning again to FIG. 2, state table 280 represents one or more data structures configured to contain entries corresponding to one or more network flows identified and processed by network security device 210. Each entry in state table 280 may include fields corresponding to the network flows. For example, each entry may include, but is not limited to, a source address, a destination address, a source port, a destination port, a protocol, and/or a protocol state. Each entry also may include a rule verdict (e.g., forward, inspect, drop) selected or determined for processing network packets that are part of the network flow. Accordingly, network security device 210 may check a received network packet against entries in state table 280 to determine if the network flow of the received network packet has already been identified and a rule verdict determined for network packets in that network flow. If a match is found in state table 280, the network packet may be processed according to the corresponding rule verdict. If no match is found in state table 280, the network packet is evaluated against a ruleset as described above and in further detail below.

Network interfaces 240 may include suitable circuitry, logic, and/or code that enable the communication of network packets of network flows such as network interfaces A, B, and C for communication of network packets via networks A, B, and C, respectively. The subject technology is not limited to any particular network protocol and/or configuration. Network interfaces 240 may be configured and controlled by processor 220 executing code and/or applications stored in memory 230.

FIG. 4 depicts a table illustrating operating modes of a network security device according to aspects of the subject technology. As represented in table 400 in FIG. 4, the operating modes of the network security device may be based on a combination of what is known about the network flow of a received network packet and what is known about the topology of the networks in communication with the network security device as indicated in the topology table described above for example. In the example depicted in FIG. 4, the knowledge about a network flow may be based on two factors: the start direction of the network flow and the original network interface of the network security device that received the initial network packet of the network flow.

Referring to the entries in table 400, the operating mode of the network security device may be to perform a normal ruleset evaluation for any level of network topology knowledge if both the start direction and the original network interface of the network flow are known. If the start direction of the network flow is known but the original network interface is not, a reverse ruleset evaluation may be performed. In the event that more than one rule match is identified using the reverse ruleset evaluation, a tie-breaker mechanism or a priority mechanism may be used to select one of the identified rule matches for the network flow. If neither the start direction nor the original network interface of the network flow is known, both a normal ruleset evaluation and a reverse ruleset evaluation are performed. In the event that more than one rule match is identified using the normal and reverse ruleset evaluations, the tie-breaker mechanism or the priority mechanism may be used to select one of the identified rule matches for the network flow.

According to aspects of the subject technology, normal ruleset evaluation evaluates attributes of a received network packet (e.g., original network interface, source address, destination address) against rule attributes of a ruleset to identify a rule match. On the other hand, reverse ruleset evaluation switches the attributes of the received network packet before evaluation against the rule attributes of the ruleset. For example, switching or reversing the attributes of the received network packet may include swapping the source address and the destination address indicated in the received network packet. In addition, switching or reversing the attributes of the received network packet also may include swapping the identifier of the original network interface with the identifier of the associated network interface. In FIG. 1, for example, network interface A is associated with network interfaces B and C. Accordingly, if the original network interface was network interface A, flipping or reversing the attributes of the received network packet may include swapping the identifier for network interface A for the identifier for network interface C to perform the reverse ruleset evaluation. Because network interface A is associated with both network interface B and network interface C, if network interface A was the original network interface, reverse ruleset evaluation may be performed twice, once with network interface A switched for network interface B and once with network interface A switched with network interface C. It is noted that switching or reversing the attributes of a network packet may not modify or replace those attributes in the network packet that is forwarded according to the rule match.

According to aspects of the subject technology, the tie-breaker mechanism may include selecting the rule match from multiple rule matches based on rankings assigned to the associated flow verdicts or processing actions. For example, the flow verdicts or processing actions may be ranked based on how conservative the associated action is relative to the other possible processing actions. In the example ruleset described above with respect to FIG. 3A, the flow verdict of forwarding network packets may be ranked as the least conservative processing action of the three possible flow verdicts and the flow verdict of dropping network packets may be ranked as the most conservative processing action of the three possible flow verdicts. The flow verdict of inspecting network packets to determine how to handle the network packets (e.g., forward or drop) may be ranked between forwarding network packets and dropping network packets. This processing action of inspecting the network packets may include enabling deep packet inspection to provide access to parameters and content of the network packets beyond what was considered when identifying the rule match in Table 300 discussed above. Deep packet inspection may provide access to both the headers and the payloads of the network packets. The network packets subject to the inspection processing action may be evaluated against another ruleset that differs from the ruleset used to determine which network packets should be inspected further (e.g., ruleset in Table 300). The network packets may be sent to a policy engine configured to evaluate the network packets against the other ruleset and to return a flow verdict on how to handle the network packets.

The description above has referenced three flow verdicts or processing actions (e.g., forward, inspect, drop) with relative rankings. The subject technology is not limited to the examples described above and may be implemented using a different number and/or different types of possible flow verdicts. In addition, the subject technology may rank the flow verdicts differently from that described above.

According to aspects of the subject technology, the priority mechanism may include selecting the rule match from multiple rule matches based on the rule priorities assigned to the associated rules. For example, the rule match corresponding to the highest rule priority (e.g., rule priority 1) may be selected. The use of the priority mechanism also may be limited to situations in which the attributes of the network packet used in the ruleset evaluation match one of the entries in the topology table. If only one of the rule matches is associated with a match to an entry in the topology table, then that rule match may be selected. If none of the rule matches is associated with an entry in the topology table, the tie-breaker mechanism discussed above may be used to select the rule match.

Figure 5:
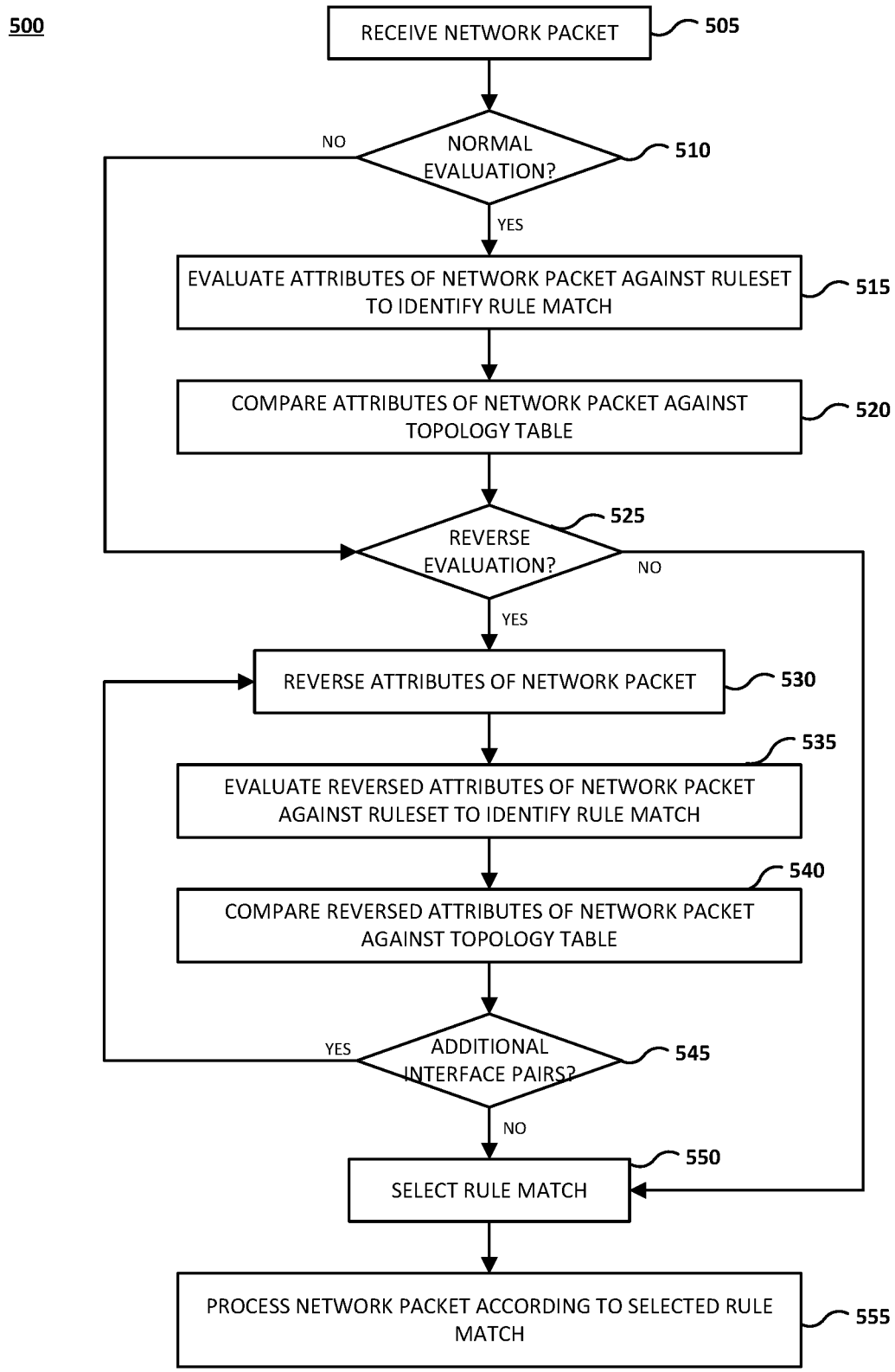
FIG. 5 is a flowchart depicting an example process for a network security device to process a network packet according to aspects of the subject technology.

FIG. 5 is a flowchart depicting an example process for a network security device to process a network packet according to aspects of the subject technology. For explanatory purposes, the blocks of the illustrated process may be described herein as occurring in serial or linearly. However, two or more blocks of the illustrated process may be performed in parallel. In addition, the blocks depicted in FIG. 5 may be performed in a different order from that shown and the process may not perform one or more of the illustrated blocks and/or may include one or more additional blocks.

According to aspects of the subject technology, process 500 may be initiated upon receipt of a network packet by a network security device such as the network security devices described above with respect to FIGS. 1 and 2 (block 505). The network security device may determine whether a normal ruleset evaluation is to be performed based on knowledge of the network topology and the network flow of the received network packet as described above with respect to FIG. 4 (block 510). If a normal ruleset evaluation is to be performed, attributes of the received network packet are evaluated against a ruleset to identify a rule match (block 515), and the attributes of the received network packet are compared against entries in a topology table (block 520).

Process 500 may further include the network security device determining whether a reverse ruleset evaluation is to be performed based on the knowledge of the network topology, the network interface pairing configuration, and the network flow of the received network packet as described above with respect to FIG. 4 (block 525). If a reverse ruleset evaluation is to be performed, attributes of the received network packet are reversed, as described above, and the reversed attributes of the network packet are evaluated against the ruleset to identify a rule match (block 535), and the reversed attributes of the received network packet are compared against entries in the topology table (block 540).

Process 500 may further include determining if the network interface on which the network packet was received is associated with more than one network interface and therefore part of more than one network interface pair (block 545). If the network interface on which the network packet was received is associated with another network interface in another network interface pair, process 500 may reverse the attributes of the received network packet using the associated network interface of the other network interface pair (block 530). The second reversed attributes of the received network packet are evaluated against the ruleset to identify a rule match (block 535), and the second reversed attributes of the received network packet are compared against the entries in the topology table (block 540). Process 500 repeats this loop (blocks 530-545) until all network interface pairs including the network interface on which the network packet was received have been identified and the associated network interfaces processed in the manner described above.

Upon completing the ruleset evaluation(s) and the topology table comparison(s), process 500 selects a rule match from the identified rule matches (block 550). Selecting the rule match from multiple rule matches may include making the selection using the tie-breaker and/or priority mechanisms described above. The received network packet is processed (e.g., dropped, inspected, forwarded) according to the rule verdict or associated action of the selected rule match (block 555).

Referring back to FIGS. 1, 3A, and 3B, examples of ruleset evaluations will be described. In one example, a network packet is received on network interface C from network device 150 (source) directed to network device 130 (destination). With no knowledge of either a start direction of the network flow or the original network interface of the network flow, both a normal ruleset evaluation and a reverse ruleset evaluation are performed. With reference to the ruleset illustrated in FIG. 3A, the forward ruleset evaluation identifies the priority 4 rule as a rule match and the reverse ruleset evaluation identifies the priority 3 rule as a rule match. Because neither the attributes of the received network packet nor the reversed attributes of the received network packet match an entry in the topology table depicted in FIG. 3B, the rule match is selected based on the rankings of the flow verdicts or associated actions of the rule matches. According to one example, the priority 4 rule is selected over the priority 3 rule because the drop action is more conservative than the inspect action.

According to a second example, a network packet is received on network interface B from network device 140 (source) directed to network device 120 (destination). With no knowledge of either a start direction of the network flow including the received network packet or the original network interface of the network flow, both a normal ruleset evaluation and a reverse ruleset evaluation are performed. With reference to the ruleset illustrated in FIG. 3A, the forward ruleset evaluation identifies the priority 2 rule as a rule match and the reverse ruleset evaluation identifies the priority 1 rule as a rule match. In this example, both the attributes of the received network packet and the reversed attributes of the network packet match entries in the topology table, the rule match is selected based on the rankings of the rule priorities of the rule matches. According to one example, the priority 1 rule is selected over the priority 2.

According to a third example, a network packet is received on network interface C from network device 150 (source) directed to network device 120 (destination). With no knowledge of either a start direction of the network flow including the received network packet or the original network interface of the network flow, both a normal ruleset evaluation and a reverse ruleset evaluation are performed. With reference to the ruleset illustrated in FIG. 3A, the forward ruleset evaluation identifies the priority 4 rule as a rule match and the reverse ruleset evaluation identifies the priority 1 rule as a rule match. In this example, the reversed attributes of the network packet match an entry in the topology table while the attributes of the network packet do not match any entries in the topology table. Accordingly, the priority 1 rule is selected because it was the only one with a match in the topology table.

Figure 6:
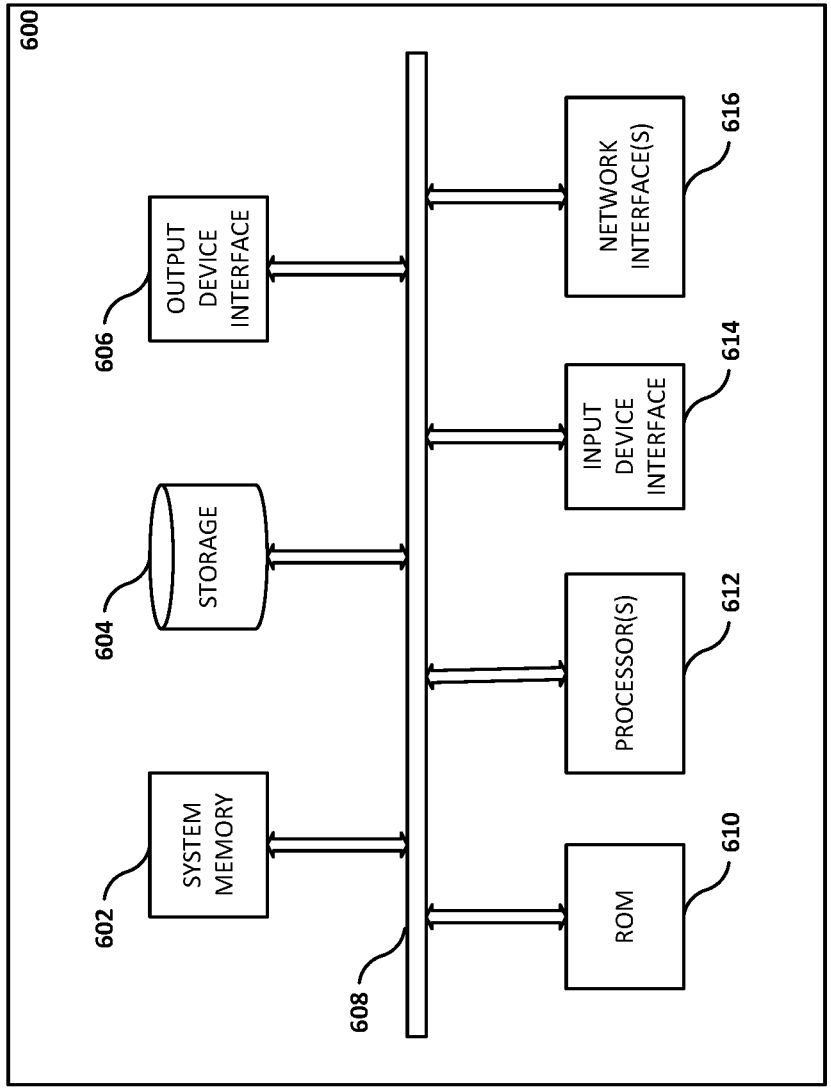
FIG. 6 is a block diagram illustrating an electronic system with which aspects of the subject technology may be implemented.

FIG. 6 conceptually illustrates an electronic system 600 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

Electronic system 600, for example, can be a network security device as described above. Such an electronic system 600 includes various types of computer readable media and interfaces for various other types of computer readable media. In one or more implementations, the electronic system 600 may be, or may include, network security device 110 and/or network security device 210. The electronic system 600 includes a bus 608, one or more processing unit(s) 612, a system memory 604, a read-only memory (ROM) 610, a permanent storage device 602, an input device interface 614, an output device interface 606, and a network interface 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multicore processor in different implementations.

The ROM 610 stores static data and instructions that are needed by the one or more processing unit(s) 612 and other modules of the electronic system. The permanent storage device 602, on the other hand, is a read-and-write memory device. The permanent storage device 602 is a non-volatile memory unit that stores instructions and data even when the electronic system 600 is off. One or more implementations of the subject disclosure use a mass-storage device (such as a solid-state drive, or a magnetic or optical disk and its corresponding disk drive) as the permanent storage device 602.

Other implementations use a removable storage device (such as a flash memory drive, optical disk and its corresponding disk drive, external magnetic hard drive, etc.) as the permanent storage device 602. Like the permanent storage device 602, the system memory 604 is a read-and-write memory device. However, unlike the permanent storage device 602, the system memory 604 is a volatile read-and-write memory, such as random-access memory. System memory 604 stores any of the instructions and data that the one or more processing unit(s) 612 needs at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input device interface 614 and the output device interface 606. The input device interface 614 enables a user to communicate information and select commands to the electronic system. Input devices used with the input device interface 614 include, for example, alphanumeric keyboards and pointing devices (also called "cursor control devices"). The output device interface 606 enables, for example, the display of images generated by the electronic system 600. Output devices used with the output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks (not shown) through one or more network interfaces 616. In this manner, the computer can be a part of one or more network of computers (such as a local area network (LAN), a wide area network (WAN), or an Intranet, or a network of networks, such as the Internet). Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

According to aspects of the subject technology, a security device is provided that includes a computer-readable storage medium storing one or more sequences of instructions, and a processor configured to execute the one or more sequences of instructions to: receive, via a first network interface, a network packet; evaluate attributes of the received network packet against a ruleset to identify a first rule match, wherein the attributes comprise an identifier of the first network interface, a source address, and a destination address; compare the attributes of the received network packet against a table listing one or more network devices associated with the first network interface or a second network interface associated with the first interface; switch the attributes of the received network packet by changing the identifier of the first network interface to an identifier of the second network interface and swapping the source address and the destination address; evaluate the switched attributes of the received network packet against the ruleset to identify a second rule match; compare the switched attributes of the received network packet against the table; select one of the first rule match or the second rule match based on the comparisons of the network packet attributes and the switched network packet attributes against the table; and process the received network packet according to the selected one of the first rule match or the second rule match.

The network packet may be the first network packet received by the security device of a network flow but may not be the initial network packet of the network flow. The network flow may include a series of network packets communicated between a first network device associated with the source address and a second network device associated with the destination address.

The processor may be further configured to execute the one or more sequences of instructions to: switch the attributes of the received network packet by changing the identifier of the first network interface to an identifier of a third network interface associated with the first network interface and swapping the source address and the destination address to generate a second set of switched attributes; evaluate the second set of switched attributes of the received network packet against the ruleset to identify a third rule match; and compare the second set of switched attributes of the received network packet against the entries in the table. One of the first rule match, the second rule match, or the third rule match may be selected based on the comparisons of the network packet attributes, the switched network packet attributes, the second set of switched network packet attributes, and the received network packet according to the selected one of the first rule match, the second rule match, or the third rule match.

The table may include an address and an associated network interface of the security device for each of the one or more network devices. The selection of the first rule match or the second rule match may be based on the comparisons of the network packet attributes and the switched network packet attributes finding one or more matches to entries in the table. The first rule match may be selected if only the network packet attributes are found to match an entry in the table, and the second rule match may be selected if only the switched network packet attributes are found to match an entry in the table.

The selection of one of the first rule match or the second rule match may be based on rankings of the first rule match and the second rule match if both the network packet attributes and the switched network packet attributes are found to match respective entries in the table. The selection of one of the first rule match or the second rule match may be based on rankings of processing actions associated with the first rule match and the second rule match in response to neither the network packet attributes nor the switched network packet attributes matching to entries in the table.

A method is described that includes: receiving, via a first network interface of a security device, a network packet that is the first network packet received by the security device of a network flow but is not the initial network packet of the network flow; evaluating attributes of the received network packet against a ruleset to identify a first rule match, wherein the attributes comprise an identifier of the first network interface, a source address, and a destination address; comparing the attributes of the received network packet against entries in a table; switching the attributes of the received network packet by changing the identifier of the first network interface to an identifier of a second network interface of the security device associated with the first network interface and swapping the source address and the destination address; evaluating the switched attributes of the received network packet against the ruleset to identify a second rule match; comparing the switched attributes of the received network packet against the entries in the table; selecting one of the first rule match or the second rule match based on the comparisons of the network packet attributes and the switched network packet attributes against the table; and processing the received network packet according to the selected one of the first rule match or the second rule match.

The network flow may include a series of network packets communicated between a first network device associated with the source address and a second network device associated with the destination address using a connection-oriented protocol.

The network flow may include a series of network packets communicated between a first network device associated with the source address and a second network device associated with the destination address using a connectionless protocol.

The entries in the table may include an address and an associated network interface of the security device for each of one or more network devices in communication with the security device via one or more networks. The selection of the first rule match or the second rule match may be based on the comparisons of the network packet attributes and the switched network packet attributes finding one or more matches to entries in the table. The first rule match may be selected if only the network packet attributes are found to match one of the entries in the table, and the second rule match may be selected if only the switched network packet attributes are found to match another of the entries in the table. The selection of one of the first rule match or the second rule match may be based on priority rankings of the first rule match and the second rule match in response to both the network packet attributes and the switched network packet attributes matching to respective entries in the table. The selection of one of the first rule match or the second rule match may be based on processing actions associated with the first rule match and the second rule match in response to neither the network packet attributes nor the switched network packet attributes matching to entries in the table. The processing actions may include one or more of packet forwarding, packet inspection, or packet dropping.

The method may further include switching the attributes of the received network packet by changing the identifier of the first network interface to an identifier of a third network interface of the security device associated with the first network interface and swapping the source address and the destination address to generate a second set of switched attributes; evaluating the second set of switched attributes of the received network packet against the ruleset to identify a third rule match; and comparing the second set of switched attributes of the received network packet against the entries in the table. One of the first rule match, the second rule match, or the third rule match may be selected based on the comparisons of the network packet attributes, the switched network packet attributes, the second set of switched network packet attributes, and the received network packet according to the selected one of the first rule match, the second rule match, or the third rule match.

A non-transitory computer-readable storage medium storing instructions which, when executed by one or more processors, cause the one or more processors to perform operations is provided. The operations include: receiving, via a first network interface of a security device, a network packet that is the first network packet received by the security device of a network flow but is not the initial network packet of the network flow; evaluating attributes of the received network packet against a ruleset to identify a first rule match, wherein the attributes comprise an identifier of the first network interface, a source address, and a destination address; comparing the attributes of the received network packet against network device entries in a table; switching the attributes of the received network packet by changing the identifier of the first network interface to an identifier of a second network interface of the network security network device associated with the first network interface and swapping the source address and the destination address; evaluating the switched attributes of the received network packet against the ruleset to identify a second rule match; comparing the switched attributes of the received network packet against the network device entries in the table; selecting one of the first rule match or the second rule match based on the comparisons of the network packet attributes and the switched network packet attributes against the network device entries in the table; and processing the received network packet according to the selected one of the first rule match or the second rule match.

The selection of the first rule match or the second rule match may be based on the comparisons of the network packet attributes and the switched network packet attributes finding one or more matches to entries in the table, and wherein the first rule match is selected if only the network packet attributes are found to match one of the entries in the table, and the second rule match is selected if only the switched network packet attributes are found to match another of the entries in the table.

The selection of the first rule match or the second rule match may be based on the comparisons of the network packet attributes and the switched network packet attributes finding one or more matches to entries in the table, and wherein the selection of one of the first rule match or the second rule match is based on priority rankings of the first rule match and the second rule match in response to both the network packet attributes and the switched network packet attributes matching to respective entries in the table.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A security device, comprising:
   a computer-readable storage medium storing one or more sequences of instructions; and
   a processor configured to execute the one or more sequences of instructions to:
     receive, via a first network interface, a network packet;
     evaluate attributes of the received network packet against a ruleset to identify a first rule match, wherein the attributes comprise an identifier of the first network interface, a source address, and a destination address;
     compare the attributes of the received network packet against a table listing one or more network devices associated with the first network interface or a second network interface associated with the first network interface;
     switch the attributes of the received network packet by changing the identifier of the first network interface to an identifier of the second network interface and swapping the source address and the destination address;
     evaluate the switched attributes of the received network packet against the ruleset to identify a second rule match;
     compare the switched attributes of the received network packet against the table;
     select one of the first rule match or the second rule match based on the comparisons of the network packet attributes and the switched network packet attributes against the table; and
     process the received network packet according to the selected one of the first rule match or the second rule match.

2. The security device of claim 1, wherein the network packet is the first network packet received by the security device of a network flow but is not the initial network packet of the network flow, and
  wherein the network flow comprises a series of network packets communicated between a first network device associated with the source address and a second network device associated with the destination address.

3. The security device of claim 1, wherein the processor is further configured to execute the one or more sequences of instructions to:
  switch the attributes of the received network packet by changing the identifier of the first network interface to an identifier of a third network interface associated with the first network interface and swapping the source address and the destination address to generate a second set of switched attributes;
  evaluate the second set of switched attributes of the received network packet against the ruleset to identify a third rule match; and
  compare the second set of switched attributes of the received network packet against the entries in the table,
  wherein one of the first rule match, the second rule match, or the third rule match is selected based on the comparisons of the network packet attributes, the switched network packet attributes, the second set of switched network packet attributes, and the received network packet according to the selected one of the first rule match, the second rule match, or the third rule match.

4. The security device of claim 1, wherein the table comprises an address and an associated network interface of the security device for each of the one or more network devices, and
  wherein the selection of the first rule match or the second rule match is based on the comparisons of the network packet attributes and the switched network packet attributes finding one or more matches to entries in the table.

5. The security device of claim 4, wherein the first rule match is selected if only the network packet attributes are found to match an entry in the table, and the second rule match is selected if only the switched network packet attributes are found to match an entry in the table.

6. The network of claim 4, wherein the selection of one of the first rule match or the second rule match is based on rankings of the first rule match and the second rule match if both the network packet attributes and the switched network packet attributes are found to match respective entries in the table.

7. The security device of claim 4, wherein the selection of one of the first rule match or the second rule match is based on rankings of processing actions associated with the first rule match and the second rule match in response to neither the network packet attributes nor the switched network packet attributes matching to entries in the table.

8. A method, comprising:
  receiving, via a first network interface of a security device, a network packet that is the first network packet received by the security device of a network flow but is not the initial network packet of the network flow;
  evaluating attributes of the received network packet against a ruleset to identify a first rule match, wherein the attributes comprise an identifier of the first network interface, a source address, and a destination address;
  comparing the attributes of the received network packet against entries in a table;
  switching the attributes of the received network packet by changing the identifier of the first network interface to an identifier of a second network interface of the security device associated with the first network interface and swapping the source address and the destination address;
  evaluating the switched attributes of the received network packet against the ruleset to identify a second rule match;
  comparing the switched attributes of the received network packet against the entries in the table;
  selecting one of the first rule match or the second rule match based on the comparisons of the network packet attributes and the switched network packet attributes against the table; and
  processing the received network packet according to the selected one of the first rule match or the second rule match.

9. The method of claim 8, wherein the network flow comprises a series of network packets communicated between a first network device associated with the source address and a second network device associated with the destination address using a connection-oriented protocol.

10. The method of claim 8, wherein the network flow comprises a series of network packets communicated between a first network device associated with the source address and a second network device associated with the destination address using a connectionless protocol.

11. The method of claim 8, wherein the entries in the table comprise an address and an associated network interface of the security device for each of one or more network devices in communication with the security device via one or more networks.

12. The method of claim 11, wherein the selection of the first rule match or the second rule match is based on the comparisons of the network packet attributes and the switched network packet attributes finding one or more matches to entries in the table.

13. The method of claim 12, wherein the first rule match is selected if only the network packet attributes are found to match one of the entries in the table, and the second rule match is selected if only the switched network packet attributes are found to match another of the entries in the table.

14. The method of claim 12, wherein the selection of one of the first rule match or the second rule match is based on priority rankings of the first rule match and the second rule match in response to both the network packet attributes and the switched network packet attributes matching to respective entries in the table.

15. The method of claim 12, wherein the selection of one of the first rule match or the second rule match is based on processing actions associated with the first rule match and the second rule match in response to neither the network packet attributes nor the switched network packet attributes matching to entries in the table.

16. The method of claim 15, wherein the processing actions comprise one or more of packet forwarding, packet inspection, or packet dropping.

17. The method of claim 8, further comprising:
  switching the attributes of the received network packet by changing the identifier of the first network interface to an identifier of a third network interface of the security device associated with the first network interface and swapping the source address and the destination address to generate a second set of switched attributes;

evaluating the second set of switched attributes of the received network packet against the ruleset to identify a third rule match; and comparing the second set of switched attributes of the received network packet against the entries in the table, wherein one of the first rule match, the second rule match, or the third rule match is selected based on the comparisons of the network packet attributes, the switched network packet attributes, the second set of switched network packet attributes, and the received network packet according to the selected one of the first rule match, the second rule match, or the third rule match.

18. A non-transitory computer-readable storage medium storing instructions which, when executed by one or more processors, cause the one or more processors to perform operations comprising:

receiving, via a first network interface of a security device, a network packet that is the first network packet received by the security device of a network flow but is not the initial network packet of the network flow;

evaluating attributes of the received network packet against a ruleset to identify a first rule match, wherein the attributes comprise an identifier of the first network interface, a source address, and a destination address;

comparing the attributes of the received network packet against network device entries in a table;

switching the attributes of the received network packet by changing the identifier of the first network interface to an identifier of a second network interface of the network security network device associated with the first network interface and swapping the source address and the destination address;

evaluating the switched attributes of the received network packet against the ruleset to identify a second rule match;

comparing the switched attributes of the received network packet against the network device entries in the table;

selecting one of the first rule match or the second rule match based on the comparisons of the network packet attributes and the switched network packet attributes against the network device entries in the table; and processing the received network packet according to the selected one of the first rule match or the second rule match.

19. The non-transitory computer-readable storage medium of claim 18, wherein the selection of the first rule match or the second rule match is based on the comparisons of the network packet attributes and the switched network packet attributes finding one or more matches to entries in the table, and wherein the first rule match is selected if only the network packet attributes are found to match one of the entries in the table, and the second rule match is selected if only the switched network packet attributes are found to match another of the entries in the table.

20. The non-transitory computer-readable medium of claim 18, wherein the selection of the first rule match or the second rule match is based on the comparisons of the network packet attributes and the switched network packet attributes finding one or more matches to entries in the table, and wherein the selection of one of the first rule match or the second rule match is based on priority rankings of the first rule match and the second rule match in response to both the network packet attributes and the switched network packet attributes matching respective entries in the table.

* * * * *